United States Patent [19]
Beckwith, Jr.

[11] Patent Number: 5,430,950
[45] Date of Patent: * Jul. 11, 1995

[54] STACKED BLOCK STEP GAGE

[75] Inventor: Walter L. Beckwith, Jr., Warwick, R.I.

[73] Assignee: Brown & Sharpe Mfg. Co., North Kingstown, R.I.

[*] Notice: The portion of the term of this patent subsequent to Aug. 3, 2010 has been disclaimed.

[21] Appl. No.: 150,122

[22] PCT Filed: Mar. 24, 1992

[86] PCT No.: PCT/US92/04379

§ 371 Date: Apr. 27, 1994

§ 102(e) Date: Apr. 27, 1994

[87] PCT Pub. No.: WO92/21930

PCT Pub. Date: Dec. 10, 1992

Related U.S. Application Data

[63] Continuation-in-part of Ser. No. 706,953, May 29, 1991, Pat. No. 5,231,768.

[51] Int. Cl.6 .............................................. G01B 3/30
[52] U.S. Cl. ........................................................... 33/567
[58] Field of Search ................................ 33/567, 567.1

[56] References Cited

U.S. PATENT DOCUMENTS

| | | | |
|---|---|---|---|
| 3,162,955 | 12/1964 | Egli | 33/567 |
| 3,276,132 | 10/1966 | Egli | 33/567 |
| 5,231,768 | 8/1993 | Beckwith Jr. | 33/567 |

FOREIGN PATENT DOCUMENTS

| | | | |
|---|---|---|---|
| 0122413 | 7/1983 | Japan | 33/567 |
| 0037201 | 2/1988 | Japan | 33/567 |
| 0114115 | 4/1990 | Japan | 33/567 |
| 1401247 | 6/1988 | U.S.S.R. | 33/567 |

Primary Examiner—Thomas B. Will
Attorney, Agent, or Firm—Wolf, Greenfield & Sacks

[57] ABSTRACT

The invention comprises a contacting block step gage in which the individual blocks are fastened together under extremely high compressive forces by a tension tube and four individually adjustable screws. The screws can be individually torqued to compensate for bending of the gage.

19 Claims, 11 Drawing Sheets

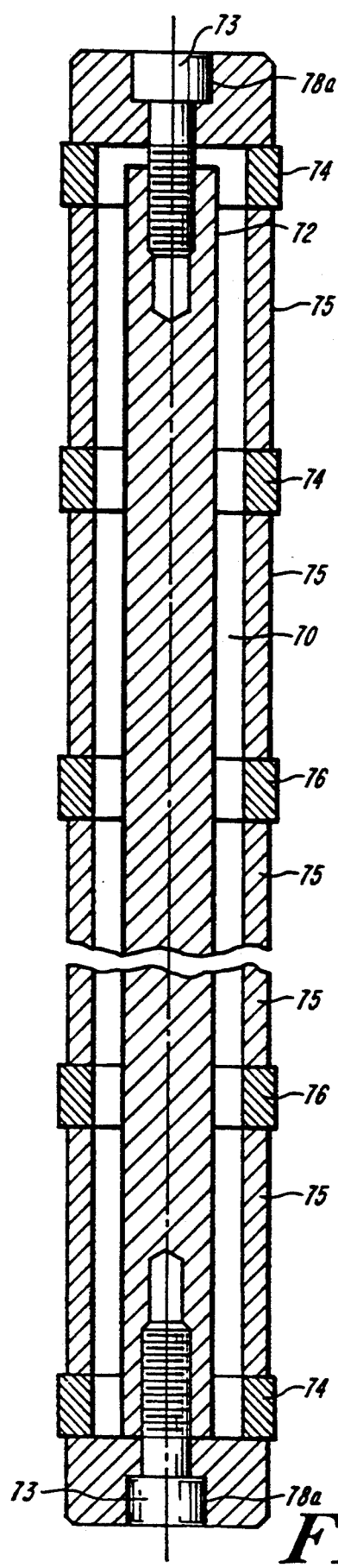
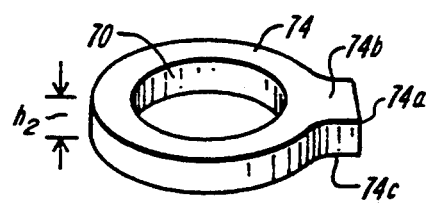
FIG. 13A
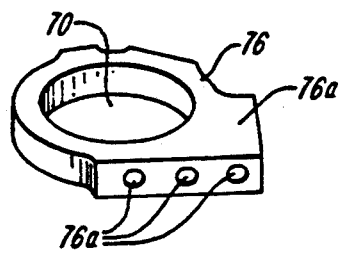
FIG. 13B
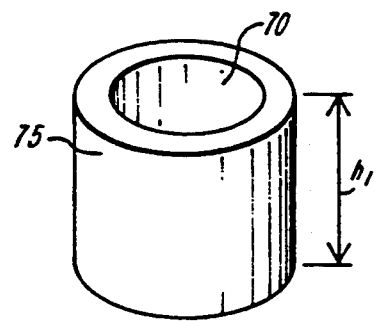
FIG. 13C
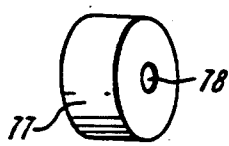
FIG. 13E
FIG. 12

STACKED BLOCK STEP GAGE

RELATED APPLICATIONS

This application is a continuation-in-part of U.S. patent application Ser. No. 07/706,953, filed May 29, 1991, entitled Stacked Block Step Gage now U.S. Pat. No. 5,231,768.

FIELD OF THE INVENTION

The invention pertains generally to step gages for calibrating measuring instruments. More particularly, the invention pertains to stacked block step gages having measuring surfaces on the neutral axis and high compressive forces between the blocks.

BACKGROUND OF THE INVENTION

Step gages are used for calibrating extremely accurate measuring instruments. A step gage typically comprises a metal block (or blocks) of a known height with opposing, parallel surfaces which are precision lapped to extremely tight tolerances. Since the height of the step gage is known to an extremely high accuracy, a measuring instrument can be calibrated based on the value measured for the height of the step gage.

Known prior art gages comprise a single block of a specified height. The opposing faces of the block are precision lapped to the desired height. In single block gages, the measuring probe can contact opposing faces of the block on the neutral axis of the gage, i.e., the axis parallel to the dimension that is being measured on which the center of gravity of the gage lies. Gages which allow measuring on the neutral axis are advantageous since any bending of the gage assembly due to gravitational forces or other factors has a minimal effect on the height of the gage at its neutral axis. Single block type gages tend to be extremely precise. However, such gages are useful for measuring only a single height, whereas it is commonly desirable to test a measuring instrument at several different heights.

Step gages are known in which a series of blocks are held in non-contacting relation by a gage assembly. The precision lapped surfaces of the blocks comprise the measuring surfaces which the probe contacts. Non-contacting block probes, such as disclosed in U.S. Pat. No. 4,445,276 issued to Voneky et al., not only provide multiple measuring surfaces at several heights along the gage, but also allow the measuring surface to be located on the neutral axis. Such gages, however, are not particularly popular because of the complexity and expense of their design and because they tend to be less accurate than other types of block gages.

Probably the most popular type of step gage is the contacting block or stacked block step gage in which a series of precision lapped blocks are stacked in contacting relationship and held together by either a through-bolt extending through mating holes in the blocks or individual screws which couple each block to a preceding block via mating holes.

U.S. Pat. Nos. 3,162,955 and 3,276,312, both issued to Egli, disclose particular stacked block step gages. U.S. Pat. No. 3,162,955 (hereinafter Egli '955) discloses a block gage assembly comprising multiple blocks, each block being coupled to a preceding block by a "hermaphrodite" bolt. Each block includes a hole which is drilled through the center of the block and countersunk. A bolt slightly longer than the height of the particular block is inserted in the hole so that the threaded distal end of the bolt extends below the bottom surface of the particular block and, when the gage is assembled, extends into the block immediately below it. The holes are countersunk to a depth that will cause the head of the bolt inserted therein to be approximately flush with the top surface of the associated block. The head of each hermaphrodite bolt includes a threaded cylindrical cavity that accepts the distal end of a bolt inserted in the hole in the block placed above it. Each block is assembled to the block below it by screwing the distal end of the hermaphrodite bolt into the cavity in the head of the hermaphrodite bolt which has been inserted in the preceding block.

U.S. Pat. No. 3,276,132 (hereinafter Egli '132) discloses a step gage assembly similar to the one disclosed in Egli '995 except that the bolts inserted into the holes in the blocks do not engage the cavity in the head of the preceding bolt (i.e., they are not hermaphrodite bolts). Instead, the uppermost portion of the hole in each block is internally threaded to engagedly receive an externally threaded insert, which insert is, in turn, internally threaded to accept the threaded distal end of the bolt inserted in the next block in the assembly. Since the bolts need not contact each other, the bolts are relatively shorter than the bolts of Egli '955 and can all be of the same length. According to Egli '132, the advantage of this design is that the compressive force of each bolt is concentrated at the abutting surfaces of the two adjacent blocks, thus reducing the bending moment on the block that would normally be caused by the compressive force of a bolt which extends through the entire block. Egli '132 discloses compressive forces placed on the blocks by the bolts on the order of 100 psi. The Egli '132 patent states that higher compressive forces are undesirable for two reasons. First, high compressive forces cause bending of the gage. Second, the blocks tend to reduce in size due to the elasticity of the material under extremely high compressive forces. In other words, extremely high compressive forces, compress the blocks causing the assembled gage to be shorter than the desired height.

The Egli '955 patent discusses the possibility of lapping the individual blocks of the gage to a size slightly larger than their nominal size so that, when they are subject to the compressive forces of the bolts, the blocks reach their nominal size.

Another example of a step gage is shown in U.S. Pat. No. 2,537,340 issued to Fonda which discloses a gage block comprising three separate block sections, a steel main section and two tungsten carbide end caps which are coupled to the main section by screws which extend through holes in the end caps and engage threaded holes in either end of the main block. The lower portions of the holes in the tip pieces are slightly larger than the screws they accept to allow the tungsten tip pieces to expand at a different rate than the steel main section without warping the tip pieces through thermal stresses within the block.

It is an object of the present invention to provide an improved step gage.

It is a further object of the present invention to provide a step gage with an increased resistance to warping and damage to minimize inaccuracies in the height of the gage.

It is another further object of the present invention to provide a stacked block type step gage wherein the measuring surface is on the neutral axis of the gage.

It is yet another further object of the present invention to provide a step gage with an increased resistance to a bending moment.

It is still another further object of the present invention to provide an extremely accurate stacked block step gage.

SUMMARY OF THE INVENTION

The invention relates to a step gage of the stacked-block type. In preferred embodiments, the blocks are coupled together by at least three through-rods extending through all blocks of the gage. Screws are threaded into each end of each through-rod and torqued to provide a compressive pressure on the blocks of greater than 100 psi and preferably greater than 1000 psi. Each of the through-rods can be individually tightened to a different tension to correct for and reduce any bending of the gage under the high pressure. The individual blocks each include probe clearance tunnels which bisect the neutral axis of the block to provide a measuring surface on the neutral axis of the gage. In the preferred embodiment, the assembled gage is subjected to vibration treatment to more evenly distribute the stress along the threads of the screws and through-rods, thus increasing the yield point of the screw threads beyond that which would likely be encountered in normal handling of the gage.

In alternate embodiments, the through-rods may be replaced by screws which individually couple one block to the preceding adjacent block and are tightened to the aforementioned minimum tensions.

In other embodiments, the gage comprises two through-rods which can be individually tightened to correct for bending in one axis. In order to eliminate any bending of the gage not parallel to that axis, the through holes of the individual block are elliptical such that they are larger than the through-rods along a second axis perpendicular to the first axis such that bending along the second axis can be corrected by adjusting the positioning of the through-rods in their individual holes.

In an even further embodiment, a single centrally located through-rod is disposed in a hole larger than the through-rod such that the through-rod can be laterally moved in any direction to correct for bending of the gage.

In yet another embodiment, the blocks are coupled together by a tension tube with an end plug secured at each end. The tension tube/end plug assembly extends through longitudinal holes in all blocks of the gage. Each end plug is adapted to have an end cap fixedly engaged thereto by means of four screws. The end caps engage the outer surfaces of the outermost blocks of the gage and exert a compressive force on the blocks when screwed into the end plug/tension tube assembly. The screws are torqued to provide a compressive pressure on the blocks of greater than 100 psi and preferably greater than 1000 psi. Each of the screws can be individually tightened to a different tension to correct for and reduce any bending of the gage under the high pressure.

In this embodiment, the blocks of the gage comprise cylindrical spacer blocks of a first diameter alternated with measurement blocks of greater transverse dimensions than the spacer blocks. The measurement blocks comprise precision lapped measuring surfaces on their transverse faces. The measuring surfaces are disposed at a position beyond the outer diameter of the spacer blocks so that they are accessible.

BRIEF DESCRIPTION OF THE DRAWING

FIG. 12 is a cross-sectional side view of the fourth embodiment of the step gage of the present invention taken along line B—B of FIG. 11.

FIGS. 13A–13E are perspective views of the various components of the step gage of the fourth embodiment of the present invention.

DETAILED DESCRIPTION OF THE INVENTION

Figure 1:
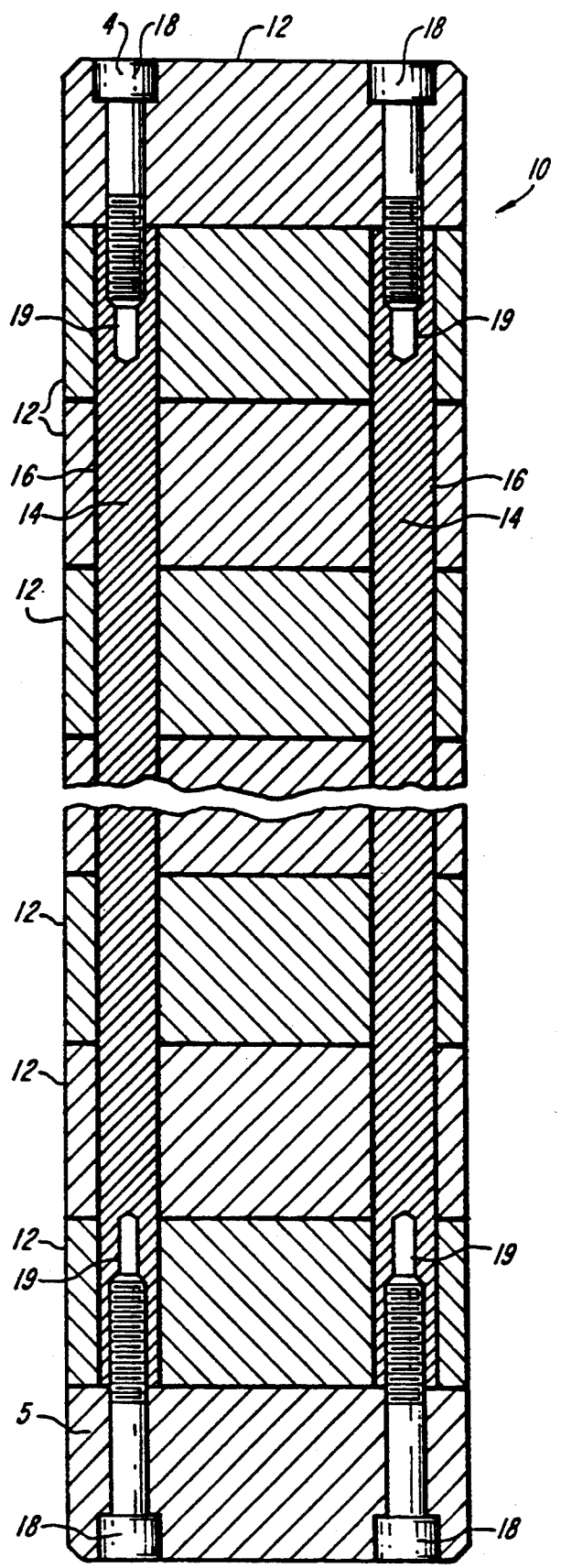
FIG. 1 is a generalized, cross-sectional side view of the step gage of the present invention.
Figure 2:
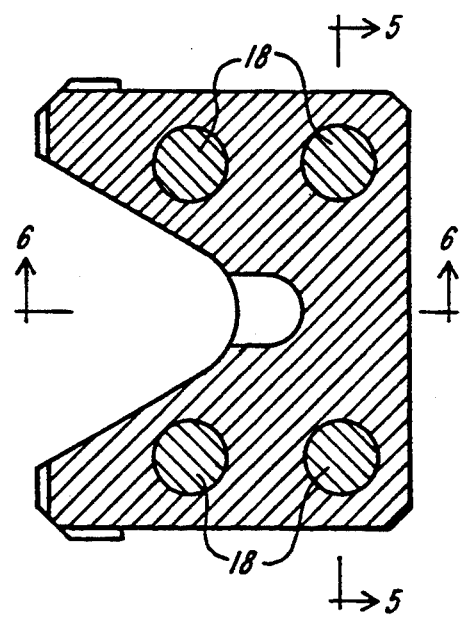
FIG. 2 is a generalized cross-sectional top view of the step gage of the present invention.

The present invention as shown in FIGS. 1 and 2, comprises a stacked block step gage 10 in which the individual blocks 12 of the gage are held together under extremely high compressive forces, such as on the order of 1,000 psi or more. In the most preferred embodiments, individual blocks 12 are coupled together by four through-rods 14 extending through mating holes 16 in blocks 12. A cylindrical, threaded cavity 19 is disposed at each end of each through-rod 14 for accepting and mating with threads of screws 18. Alternately, the ends of each through-rod 14 may be externally threaded to mate with bolts.

Gage 10 is constructed first by inserting screws 18 into the holes 16 in the bottom-most block. The rods are threaded onto screws 18 and the remaining blocks are stacked thereon so that the rods extend through holes 16 thereof. The number and size of the blocks is chosen in accordance with the desired height of the gage and the applicable testing protocol. When the final block is assembled, a screw 18 is threaded into the cylindrical cavity in the end of each rod 14 opposite the bottom-most block, i.e., adjacent the top-most block.

The following equations are useful for determining the parameters of the gage, such as the screw torque necessary to achieve a particular compressive pressure in the gage, and the shrinkage of the individual blocks and overall blocks, under the compressive pressure of the rods or screws.

$$Torque = C \cdot D \cdot F$$

where
C = torque coefficient (approximately 0.2 for dry steel)
D = outer diameter of screw threads
F = screw (or rod) tension $$\text{Stress in rods} = \frac{\text{Force}}{\text{Cross-section area of rod}}$$

$$\text{Compressive stress in each block} = \frac{\text{Number of rods} \cdot \text{Screw tension}}{\text{Cross-section area of block}}$$

If we assume the following parameters,
screw torque, T, = 160 inch lbs.
screw outer diameter = 0.236 inches,
gage length = 1000 mm
rod diameter = 10 mm (or 0.394 inches),
horizontal cross-sectional area of block = 3.560 sq. inches
then the following calculations provide the parameters of the exemplary gage.

$$\text{Screw tension} = F = \frac{160 \text{ in. lbs.}}{(0.236 \text{ in.})(0.2)} = 3390 \text{ lbs.}$$

In a 1,000 mm gage employing steel rods 1,000 mm in length and 0.394 inches in diameter, each rod is stretched about 0.929 mm as illustrated below:

If the rod has a diameter of 10 mm (or 0.394 inches), then $$\text{stress in each rod} = \frac{3390 \text{ lbs.}}{\frac{\pi}{4} \cdot (.394 \text{ inches})^2} = 27,800 \text{ psi,}$$

$$\text{Strain} = \frac{\sigma}{\text{Young's Modulus}} =$$

$$\frac{27,800 \text{ psi}}{3.0 \times 10^7} = .000926666 \text{ in/in (or mm/mm)}$$

Stretch in 1000 mm rod = (.000926666)(1000 mm) = .929 mm

If the cross-sectional area of the block is 3.560 in², the compressive pressure between the blocks is approximately 3,775 pounds per square inch (psi) as calculated below:

$$\text{Compressive stress in each block} = \frac{4 \times 3660 \text{ lbs.}}{3.560 \text{ in.}^2} = 3809 \text{ lbs./in.}^2 \text{ or psi}$$

$$\text{Strain} = \frac{\sigma}{\text{Young's Modulus}} =$$

$$\frac{3809}{3.0 \times 10^7} = .000126966 \text{ in/in (or mm/mm)}$$

Under this strain, each block's height decreases 0.00317 mm., as calculated below.

$$Block\ compression = (25\ mm)(0.000126966\ mm/mm) = 0.00317\ mm$$

Since the compression of the blocks is quite accurately known, the blocks can be lapped to a predetermined size greater than the nominal size such that, under the high compressive forces, they are compressed to the nominal size.

Standardized protocols for evaluating the accuracy of measuring instruments exist. The gages of the present invention are particularly designed to meet the requirements of two specific protocols, the American National Standard Institute's Methods for Performance Evaluation of Coordinate Measuring Machines, ANSI/ASME B89.1.12M-1985 (hereinafter the ANSI/ASME protocol) and the German National Standard, Accuracy of Coordinate Measuring Machines, VDI/VDE 2617 (hereinafter the VDI/VDE protocol).

The ANSI/ASME protocol requires that measurements be made between measuring surfaces facing in the same direction. For coordinate measuring machines having full measurement lines of 250 mm or less, distances between the steps may be no greater than 25 mm. For lengths greater than 250 mm, the lengths between steps may be no greater than 1/10 of the full scale measurement line of the machine.

The VDI/VDE protocol requires that measurements be made between measurement surfaces facing in opposite directions and for any measurement line, measurements of ten different lengths be made. The shortest length must be no greater than 25 mm.

Figure 3:
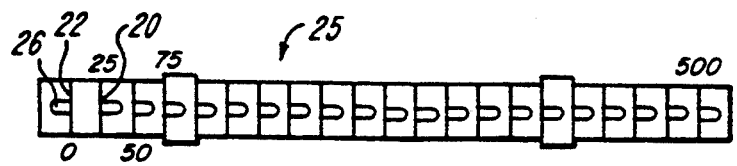
FIG. 3 is a side view of a first embodiment of the step gage of the present invention.
Figure 5:
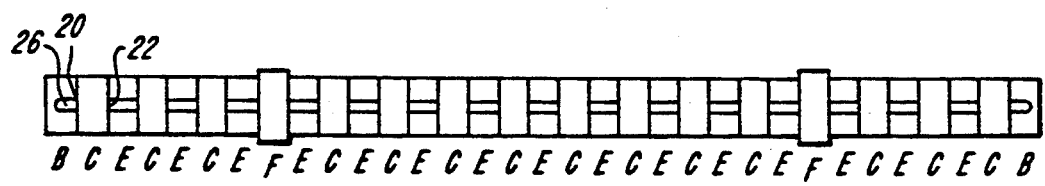
FIG. 5 is a side view of a second embodiment of the step gage of the present invention.

In accordance with these protocols, the embodiment shown in FIG. 3 are preferred for gages of length up to 500 mm, whereas the embodiment shown in FIG. 5 is preferred for gages 500 mm in length and greater. The purposes of the different embodiments will become apparent from the discussion below.

FIG. 3 shows a step gage constructed in accordance with a first embodiment of the present invention which is preferred for gages 500 mm or less in height. The ANSI/ASME protocol specifies that gages of length less than 500 mm should be tested with measuring intervals of 25 mm with the probes contacting measuring surfaces facing in the same direction. In accordance with this protocol, the gage 25 of FIG. 3 is constructed of four different types of blocks designated blocks A, B, C and D. As shown in FIG. 3, the gage is formed mostly of A blocks except that the blocks at either end of the gage are B blocks. A C block is placed adjacent one of the end B blocks. Finally, D blocks are occasionally substituted for A blocks in the block sequence. The structure and purpose of each block is explained below.

The construction of the various blocks is shown in FIG. 4. An A block is shown in FIG. 4A. The A block comprises two opposing, parallel, precision lapped surfaces 20 and 22. In the preferred embodiment, surfaces 20 and 22 of each block are spaced 25 mm apart. Each A block comprises four drilled through-holes 24 disposed near the corners of the block. The block has a semi-elliptical cut-out 26. Within the semi-elliptical cut-out is a second cut-out, probe clearance channel 28, communicating with the upper surface 20 and extending halfway to the bottom surface 22. Probe clearance channel 28 allows the probe access to the area on the surface 22 of the adjacent block disposed on the neutral axis of the block. This area is the measuring surface 30. An end block, B, is shown in FIG. 4B and is identical to an A block except that the holes 24 are replaced by holes 32 which are through-drilled and counterbored at one end as shown at 34. These holes are counterbored to accept the heads of the screws which engage the through-rods and fasten the gage together under pressure. A C Block is shown in FIG. 4C and is identical to an A block except that probe clearance channel 28 and measuring surface 30 are eliminated for reasons explained below. Finally, a D block is shown in FIG. 4D and is identical to an A block except that it has additional projecting surfaces 36. The projecting surfaces 36 are precision lapped to be perpendicular to the faces 20 and 22 and measuring surface 30, and are used to align the assembled gage with the measuring line of the coordinate measuring machine to be tested. The holes 24 in the A, C and D blocks allow rods 14 to pass therethrough. The holes 32 in the end cap B blocks are designed to accept the screws 18. The counterbored portions 34 of holes 32 in the B blocks accept the heads of screws 18 which rest on shoulders 35. To reduce the complexity of block construction, the B block at each end is identical. Accordingly, one of the B blocks must be assembled to the gage upside down relative to the other B block and other blocks in a gage. The C block, which is essentially an A block without a probe clearance channel is assembled adjacent to the "upside down" B block. Since the probe clearance channel 28 of the "upside down" B block affords access to the measuring surface of the adjacent C block, there is no need for a probe clearance channel 28 in the C block to access the neutral axis. The neutral axis of the top surface 20 of the C block is accessible and can be used as the measuring surface. The purpose of the C block is to provide for the possibility of taking measurements on opposing surfaces, as required by the VDI/VDE protocol.

The D blocks are substituted for B blocks at intervals throughout the gage and, as described above, are useful in aligning the gage as it is being constructed.

Measuring probes can access and contact the centrally located measuring surfaces of the A blocks via cut-out 26 and and probe clearance channel 28. The measuring surface of the A blocks is on or near the neutral axis and also is protected from damage by contact with other objects since it is well protected by the surrounding block.

Figure 4A:
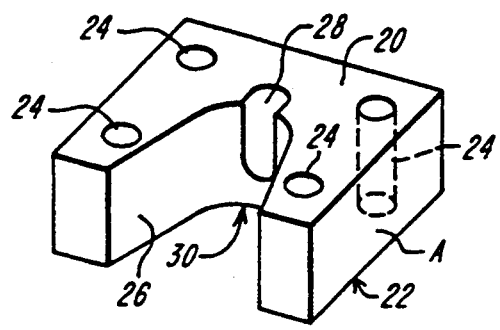
FIGS. 4A–4F are perspective views illustrating the individual blocks from which the first and second embodiments of the step gage of the present invention are constructed.
Figure 4B:
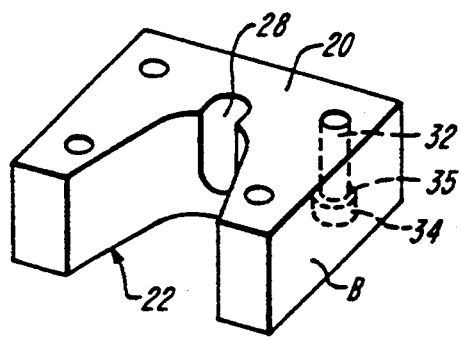
Figure 4C:
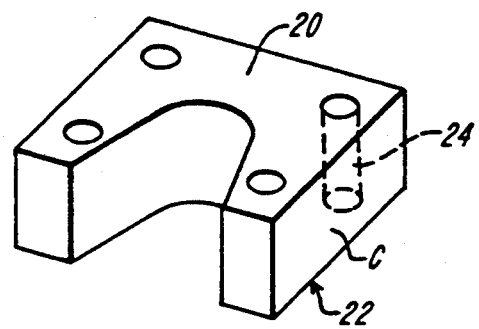
Figure 4D:
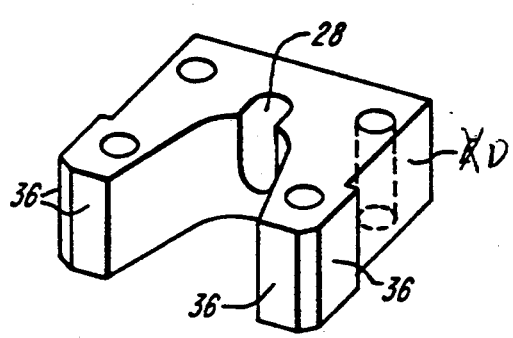
Figure 4E:
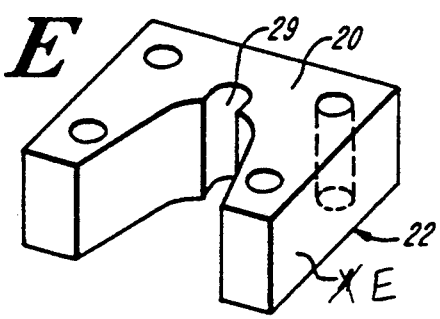
Figure 4F:
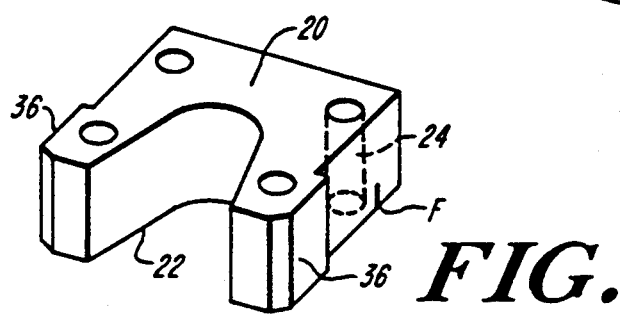

For gages in excess of 500 mm in height, the alternative embodiment shown in FIG. 5 is preferred. The embodiment of FIG. 5 uses B and C blocks, but not A or D blocks. The embodiment of FIG. 5 uses two new blocks, E and F blocks, as shown in FIGS. 4E and 4F, respectively. An E block, as shown in FIG. 4E, is similar to an A block except that probe clearance channel 28 is replaced by probe clearance channel 29 which is cut completely through the block. An F block, as shown in FIG. 4F, is similar to a D block except the probe clearance channel is eliminated. The gage is formed as shown in FIG. 5 and essentially comprises alternating C and E blocks with the end caps formed from B blocks. F blocks are substituted for C blocks at various points in the gage to assist in the alignment of the gage with the measuring line of the machine being tested. In this embodiment, the measuring surfaces comprise the top and bottom surfaces of the C blocks (or F blocks as the case may be). Since the probe clearance channel extends completely through the E blocks from the top surface to the bottom surface, the neutral axis portion of the top surface 20 and bottom surface 22 of the C blocks (or F blocks) are accessible, thus allowing the probe to contact those surfaces so that they can be used as the measuring surfaces. Accordingly, in this embodiment, the measuring surfaces remain on the neutral axis of the gage. Further, measurements can be taken with the probes contacting opposing measuring surfaces or contacting measuring surfaces facing the same direction.

The embodiments of FIG. 3 and FIG. 5 are adapted for use with both the ANSI/ASME and VDI/VDE protocols. For instance, the gage of FIG. 3 is useful for measurement lines up to 500 mm. With respect to the ANSI/ASME protocol, all steps, except step 22 which faces in the wrong direction, may be used. Since the distance between all steps is 25 mm, the ANSI/ASME requirement that no step exceeds 25 mm is met. The gage of FIG. 5 is adapted for lines 500 mm in length or longer. All measurements are made between alternate measuring surfaces, since these all face in the same direction. Since the blocks are 25 mm long, alternate faces are 50 mm apart, or 1/10 of 500 mm. Accordingly, the ANSI/ASME requirement is met by the gage of FIG. 5.

Turning to the VDI/VDE protocol, the FIG. 3 gage is also used for measurement lines up to 500 mm. All measurements are made from step 22 to some other step. This meets the VDI/VDE protocol since the measurements are taken from opposing faces with a minimum step of 25 mm. For measurement lines over 500 mm, the FIG. 5 gage is used. The shortest measurement, made from one face of any C block to the opposing face of the same C block is 25 mm. Thereafter, opposite facing measuring surfaces are available every 50 mm. Again, this is consistent with the VDI/VDE protocol.

The extremely high compressive forces of the present invention provide distinct advantages over the prior art. As discussed above, if the screws 18 are tightened to a torque of approximately 160 inch lbs., the tension in each rod will be approximately 3,390 lbs. In a gage 1,000 mm in height, each rod is stretched approximately 0.929 mm. In this example, the compressive pressure between the blocks would be approximately 3,809 psi.

An obvious advantage of a high compressive force is that it will more effectively prevent slippage between the blocks and bending of the gage during handling.

Figure 6:
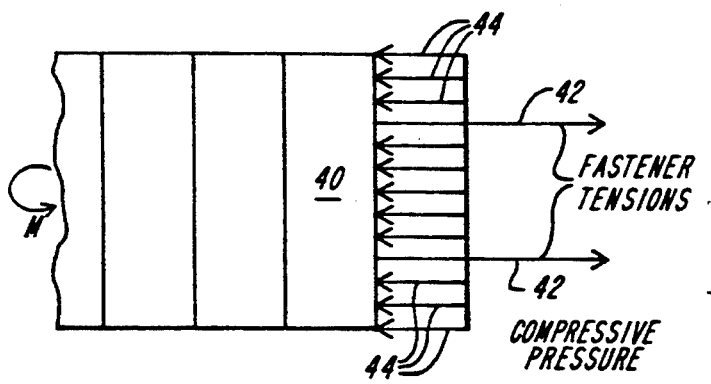
FIG. 6 is a diagram illustrating the forces applied to the surface of a block of a step gage assembled in a stack under normal conditions.
Figure 7:
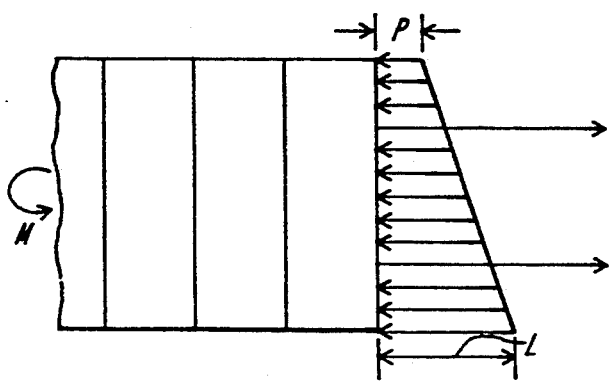
FIG. 7 is a diagram illustrating the forces applied to the surface of a block of a step gage assembled in a stack subject to a bending moment.
Figure 8:
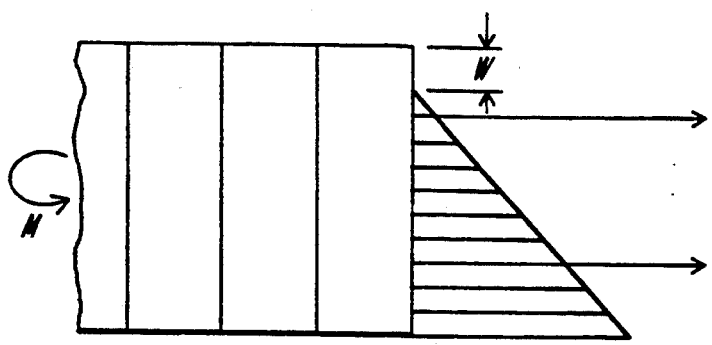
FIG. 8 is a diagram illustrating the forces applied to the surface of a block of a step gage assembled in a stack subject to a bending moment greater than the bending strength of the gage.

FIGS. 6, 7 and 8 illustrate the advantages of the invention's use of high compressive forces between the blocks.

When two blocks are secured together by very high tensions, distortion of the blocks occurs. In areas furthest from the fastenings, i.e., furthest from the through-rods, the blocks tend to bend slightly away from each other to relieve the pressure between the blocks. The blocks will distort to a shape in which the blocks have the minimum strain energy.

In a block gage greater than two blocks in height, the situation is quite different. FIG. 6 illustrates stress and force distribution across one of the faces of a block 40 in the middle of a gage. It should be understood that there is a block to the right of block 40 which is not shown. As shown in FIG. 6, except for the end blocks, each block in the gage is subject to compressive forces at both faces and, therefore, cannot bend away from either of its neighboring blocks since that would involve simultaneously bending in opposite directions. Accordingly, the blocks remain flat, and compressive pressure is uniform over the block face. There is some decrease in pressure at the extreme edges of the face due to radial distortion, however, this effect is negligible. As shown in FIG. 6, the through-rods and screws exert forces 42 on each other which are concentrated at the holes. To counterbalance the tensile force of the through-rods, the blocks exert pressure on each other in opposite direction to the fastener force 42, as illustrated by pressure arrows 44.

When a bending moment M, as shown in FIG. 7, is applied to the gage, the average compressive pressure on the block face remains constant. However, the distribution of the compressive pressure changes to balance the moment, as shown in FIG. 7. Pressure is greatest at one extreme end of the block, shown as pressure L, and linearly decreases to a minimum pressure P at the other end. As the moment M is increased, minimum pressure P at one edge of the face decreases, while maximum pressure L at the opposite edge increases. As shown in FIG. 8, if moment M is high enough, the compressive pressure P at the extreme edge can be reduced to zero and a gap will appear between the blocks as shown at W in FIG. 8. The moment M which causes pressure P to equal 0 is termed the bending strength of the gage. When a gap forms in a gage due to bending moment greater than the bending strength of the gage, dirt and oil can enter into the gap causing the gage to be inaccurate even after the bending moment is released. Obviously, as the force 42 of the fasteners is increased, the counterbalancing pressure 44 on the block faces also increases. Accordingly, the greater the tension on the fasteners, the greater the bending strength of the gage.

The Egli patents, however, teach that it is undesirable to increase the tension on the blocks much beyond 100 psi despite the desire to increase the bending strength of the gage because the extremely high compressive pressures of the rods will itself cause the gage to bend.

The present invention, in all its various embodiments, overcomes this problem and allows for compressive pressures between the blocks that are orders of magnitude greater than 100 psi. By utilizing multiple rods rather than a single through-rod, each rod can be individually tensioned to a different compressive pressure to eliminate any bending of the gage.

When the gage is assembled, it is checked for bending within specified tolerance limits. To check for bending, the gage height can be measured at each of its four corners. If one or more of the corners is out of specification, the tension in one or more of the through-rods can be individually adjusted by tightening or loosening the corresponding screws to cause a commensurate decrease or increase, respectively, in the height of the gage at that corner or corners.

Further, the use of through-rods rather than screws to individually couple each block to the preceding block is advantageous because the greater length of the through-rods provides more elasticity than screws. Accordingly, changes in tension of the rods due to handling is significantly reduced.

Mating screw threads cannot be accurately produced at a reasonable expense. Therefore, when a screw such as screw 18 is entered into a threaded hole such as in the through-rods, contact between the mating screw threads appears at a few points. As the screw is tightened, yielding of the screw thread surfaces occurs and the number and extent of the areas of contact increases. When a screw is fully tightened, part of the screw thread surface is in contact and stressed to the yield point, part is in contact at lower stresses and part is not in contact at all. The increased amount of yielding of the screw threads in the present invention caused by the greater compressive force makes the screws more vulnerable to reduction of the screw tensions during handling and an increase in the height of the gage during handling. This is undesirable. This problem is overcome in the present invention by subjecting the assembled gage to subresonant vibration treatment after the screws have been fully torqued (i.e., after assembly and individual tensioning of the screws to correct for any bending) but before the calibration. As described in A. G. Hebel Jr., *Subresonant Vibrations Relieve Residual Stress*, Metal Progress, November 1985, pp 51–55, subresonant vibration (at about $\frac{1}{3}$ the peak resonance frequency of the item) increases atomic activity, thus relieving stress. It is important to select a subresonant vibration frequency where the item (gage) damps most of the vibratory energy thereby using the vibratory energy to increase atomic activity as opposed to resonant energy. The vibration treatment causes the screw thread surfaces to yield even further (and the height of the gage to increase further) beyond that which would be caused by normal handling. The gage can then be height calibrated. The screw thread yielding caused by the vibration treatment is greater than any yielding likely to be caused by normal handling and, therefore, the gage is unlikely to increase in height due to normal handling.

In its most effective form as previously described, the gage comprises three or more rods whose ends are not positioned in a straight line on the surface of the end block. If the rods are disposed in a line, individual tensioning of the rods cannot correct for components of a bending moment not parallel to that line.

Figure 10:
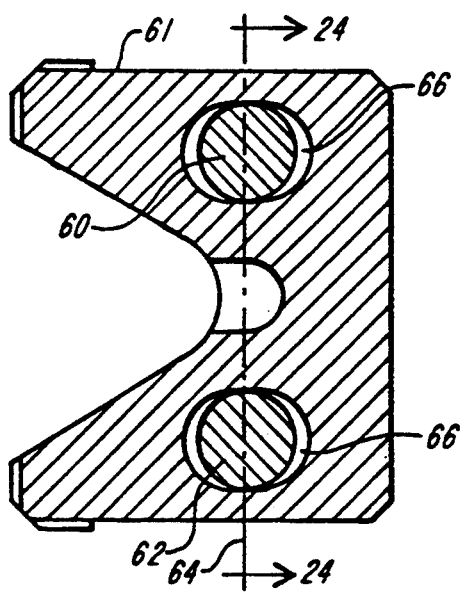
FIG. 10 is a cross-sectional top view of a third embodiment of the step gage of the present invention.
Figure 9:
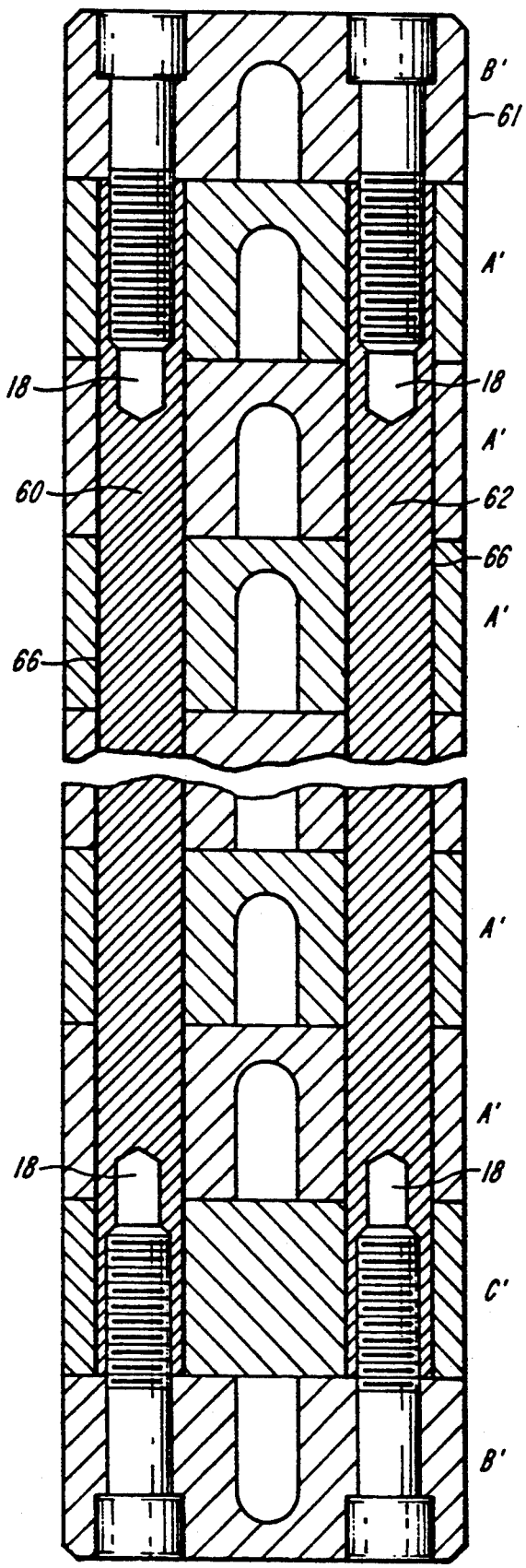
FIG. 9 is a cross-sectional side view of a third embodiment of the step gage of the present invention.
Figure 11:
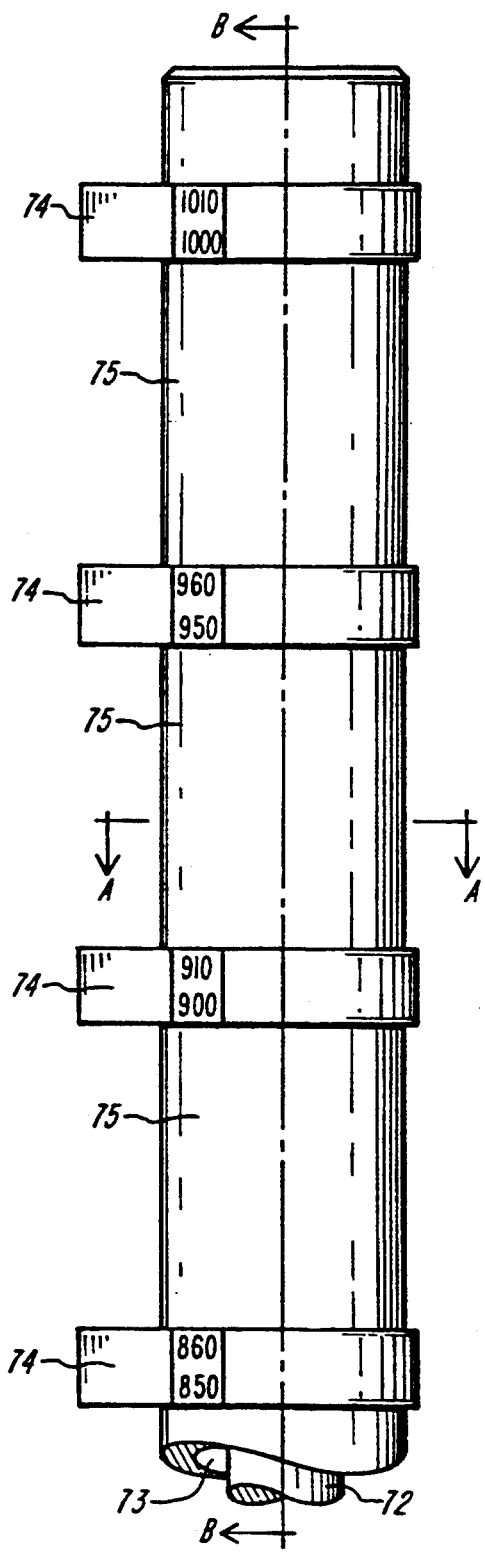
FIG. 11 is a side view of a fourth embodiment of the step gage of the present invention.

However, alternate embodiments of the invention are envisioned which utilize less than three rods yet, nonetheless, allow correction of all bending moments. For instance, FIGS. 9 and 10 show a gage utilizing only two through-rods 60 and 62 disposed on line 64. Line 64 intersects through-rods 60 and 62 on the face of B block 61. The holes 66 in the blocks through which the through-rods 60 and 62 pass, are elliptical and have a major axis perpendicular to line 64. This configuration allows the screws to be individually positioned within the holes (i.e., adjusted left to right in FIG. 10) to correct for any bending moment component perpendicular to the line 64. The two rods also can be adjusted to different tensions to correct for any component of a bending moment parallel to line 64. In FIG. 9, the individual blocks are labeled as A', B', or C' blocks. These blocks are substantially similar to the correspondingly lettered blocks shown in FIG. 4 except that they comprise only two holes 24 (or 32 in the case of the B and B' blocks) rather than four.

FIGS. 11–15 illustrate a further embodiment of the present invention utilizing only a single through-rod and a mounting bracket. In this embodiment, the hole 70 is positioned on the neutral axis and is circular in shape but is slightly larger than the through-rod 72.

Figure 13D:
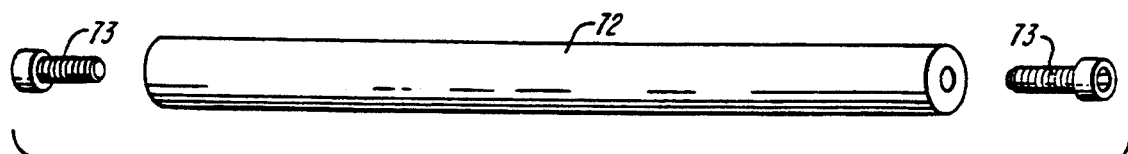

FIG. 13 illustrates the individual components of the step gage of this embodiment. The step gage of this embodiment primarily comprises alternately stacked step blocks 74 and block spacers 75 both having central holes 70 for accepting a through-rod 72. The step block 74 comprises a projection 74a having opposing measuring surfaces 74b and 74c. In the preferred embodiment the height $h_1$ of the block spacer 75 is 40 mm and the height $h_2$ of the step blocks 74 is 10 mm. At two points along the length of the gage, the step blocks 74 are replaced by mounting step blocks 76. Mounting step block 76 is similar to step blocks 74 except they are provided with projection 76a comprising three threaded screw holes 76b for mounting to a mounting bracket as described below. The through-rod holes 70 in the step blocks 74, block spacers 75 and mounting step blocks 76 have a larger diameter than the through-rod 72. An end cap 77 is provided at each end of the gage having a central hole 78 for accepting the distal end of screws 73. The holes 78 are counterbored as shown at 78a in FIG. 12 for accepting the heads of screws 73. The end caps 77 are placed over the step blocks 74 at either end of the gage and the screws 73 are inserted in the holes 78 and screwed into threaded cavities in either end of through-rod 72. The gage is then checked for bending. If the gage is bent beyond the acceptable tolerance, the screws 73 are loosened and the screws and rod are moved transversely within hole 70 in a direction which will correct for the bending. The screws 73 are then retightened. After one or more trials, bending should be reduced to within tolerance. Since the through-rod 72 is on the neutral axis in this embodiment, the measuring surfaces cannot also be located on the neutral axis. However, a mounting bracket 79 is provided which assures that the measuring surfaces will remain on the neutral surface of the gage. Although the single through-rod embodiment prevents placement of the measuring surface on the neutral axis, it affords a significant savings in weight. The blocks of a gage must comprise a sufficient mass and surface area to support its through-rods. Accordingly, with only one through-rod, the cross-section of the gage perpendicular to the rod can be greatly reduced. Accordingly, in many circumstances, the single rod embodiment may be preferred.

Figure 14:
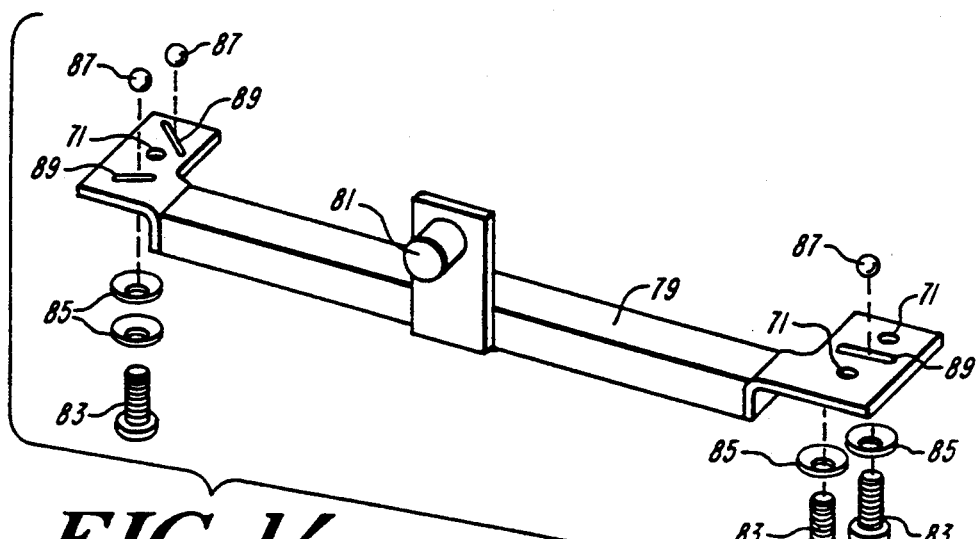
FIG. 14 is a perspective view of a mounting bracket of the step gage of the fourth embodiment of the present invention.

Mounting bracket 79, shown in FIG. 14, is designed to assure that the gage is mounted with the measuring surfaces on the neutral surface. The bracket 79 is mounted in a stand (not shown) by means of a stud 81 which fits into a horizontal hole in the stand. Accordingly, the mounting step blocks 76 are positioned in the step gage such that the holes 76b mate with the screws 83 in the bracket 79. The length of the bracket 79 and positioning of the mounting step blocks are chosen with respect to the length of the step gage such that the bending moments of the gage due to its own weight cancel each other to the maximum extent possible.

The distal ends of screws 83 fit through holes 71 in mounting bracket 79 and within threaded holes 76b on mounting step blocks 76. Conical springs 85 are provided on the screws to help prevent overtightening of the screws and damaging of the gage. Balls 87 are placed in slots 89 on the mounting bracket 79 such that the step gage does not contact the mounting bracket except at balls 87. The purpose of the balls is to minimize the contact area between the gage and the mounting bracket to three small points so as to avoid the warping of the gage which might otherwise occur if the gage was compressed against a flat surface of the mounting bracket 79. The mounting step blocks 76 are oriented with respect to the measuring surfaces of the step blocks 74 such that when the gage is mounted in the bracket 79 and the bracket is mounted with stud 81 in a horizontal hole, the measuring surfaces of step blocks 74 are on the neutral surface of the bending moment of the gage caused by the weight of the gage hereafter termed the gravitational bending moment (see FIG. 15). In this manner, even though the measuring surfaces are not on the neutral axis, they will be on the neutral surface if the gage is properly mounted.

Figure 16:
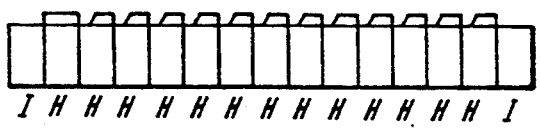
FIG. 16 is a side view of a fifth embodiment of the step gage of the present invention.
Figure 17:
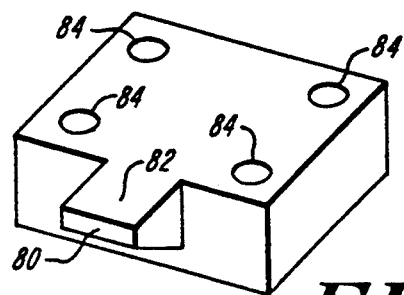
FIG. 17 is a perspective view of one block of the step gage of the fifth embodiment of the present invention.

FIGS. 16 and 17 illustrate a further embodiment of the invention utilizing four through-rods but providing measuring surfaces off the neutral axis. This embodiment utilizes two different blocks, H blocks and I blocks. As shown in FIG. 17, each H block is provided with an outcropping 80 which provides measuring surface 82 at the edge of the block. The H blocks include four through-holes 84 for accepting through-rods as previously described. The I blocks are used as end blocks and are similar to the H blocks except they are not provided with projections 80 and the holes are through-drilled and counterbored for accepting the heads of the screws. This embodiment has the advantage of providing a more accessible measuring surface. However, the disadvantage is that the measuring surface is not on the neutral axis.

Figure 15:
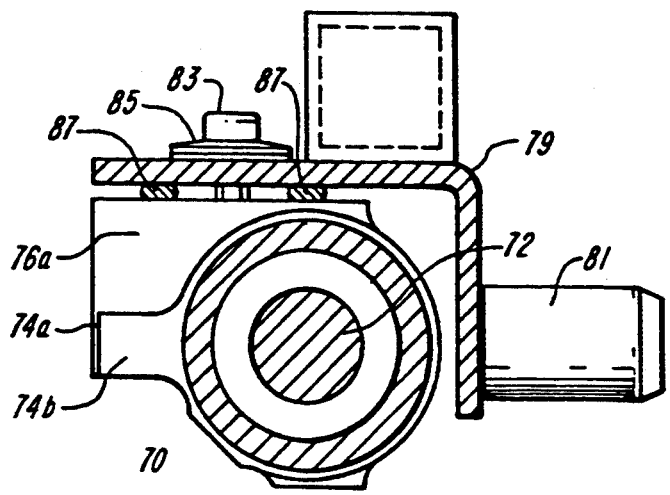
FIG. 15 is a cross-sectional top view of the step gage of the fourth embodiment of the present invention mounted on the mounting bracket of FIG. 14, taken along line A—A of FIG. 11.
Figure 18:
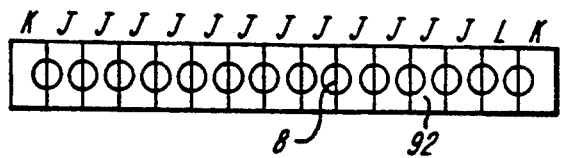
FIG. 18 is a side view of a sixth embodiment of the step gage of the present invention.
Figure 19:
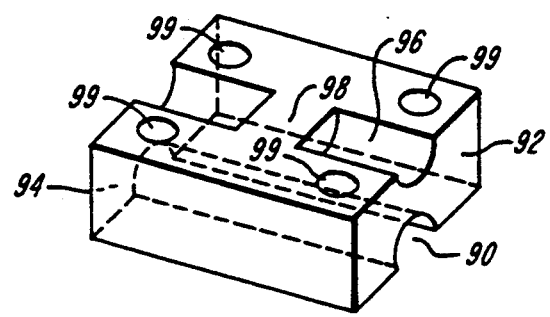
FIG. 19 is a perspective view of one block of the step gage of the sixth embodiment of the present invention.

FIGS. 18 and 19 illustrate another embodiment of the present invention embodying J blocks, K blocks and L blocks. FIG. 19 shows a J block. Each J block comprises a semi-circular tunnel 90 extending completely through the block from side surface 92 to side surface 94. A similar tunnel 96 is provided on the opposite face of the block but does not extend completely through the block from surface 92 to surface 94. Instead, the central portion of the tunnel is left within the block so as to provide measuring surface 98. The J blocks are provided with four through-drilled holes 99 for accepting rods. The K blocks are similar to the J blocks except that tunnel 96 is not present and the holes are through-drilled and counterbored to accept the heads of the screws. The L block is similar to the J block except tunnel 90 is replaced by a tunnel like tunnel 96. In other words both of the tunnels in the L block are tunnels 96. When the gage is assembled as shown in FIG. 15, the measuring surfaces 98 are accessible from either side of the gage.

Figure 20:
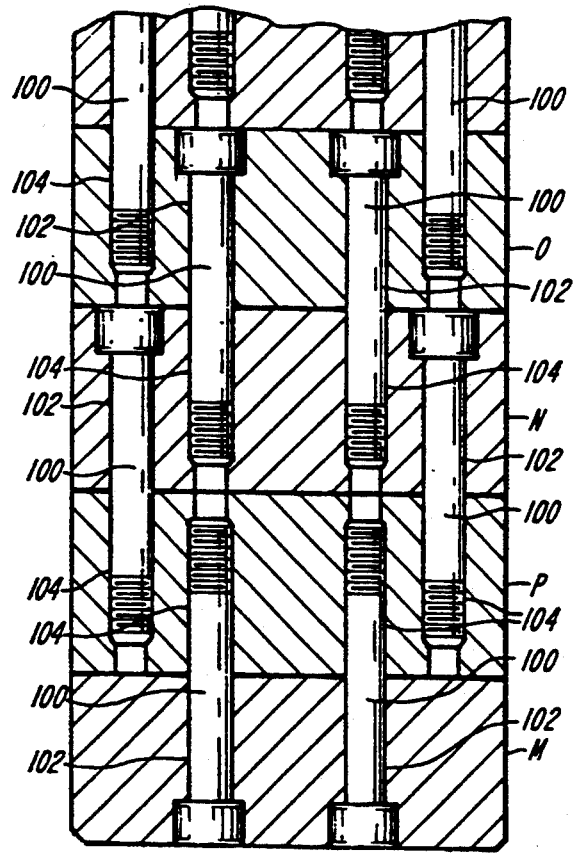
FIG. 20 is a cross-sectional side view of a seventh embodiment of the step gage of the present invention.
Figure 21:
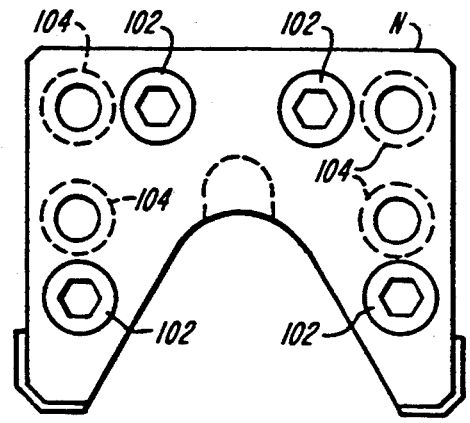
FIG. 21 is a cross-sectional top view of an eighth embodiment of the step gage of the present invention.
Figure 22:
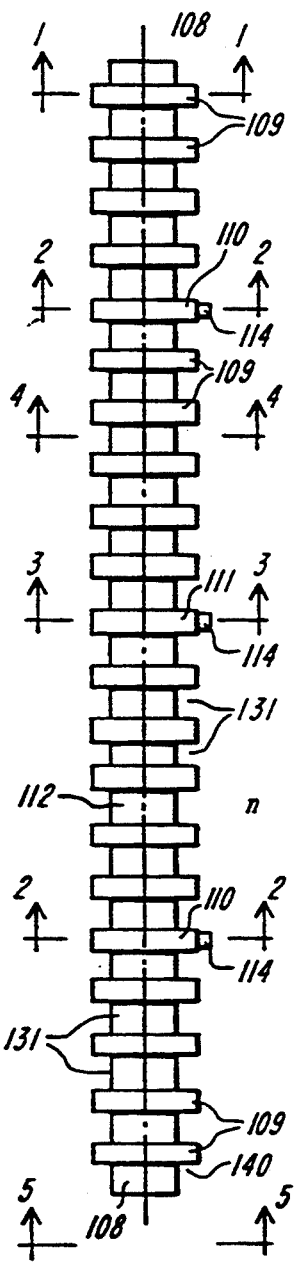
FIG. 22 is a side view of a ninth embodiment of the step gage of the present embodiment.
Figure 23:
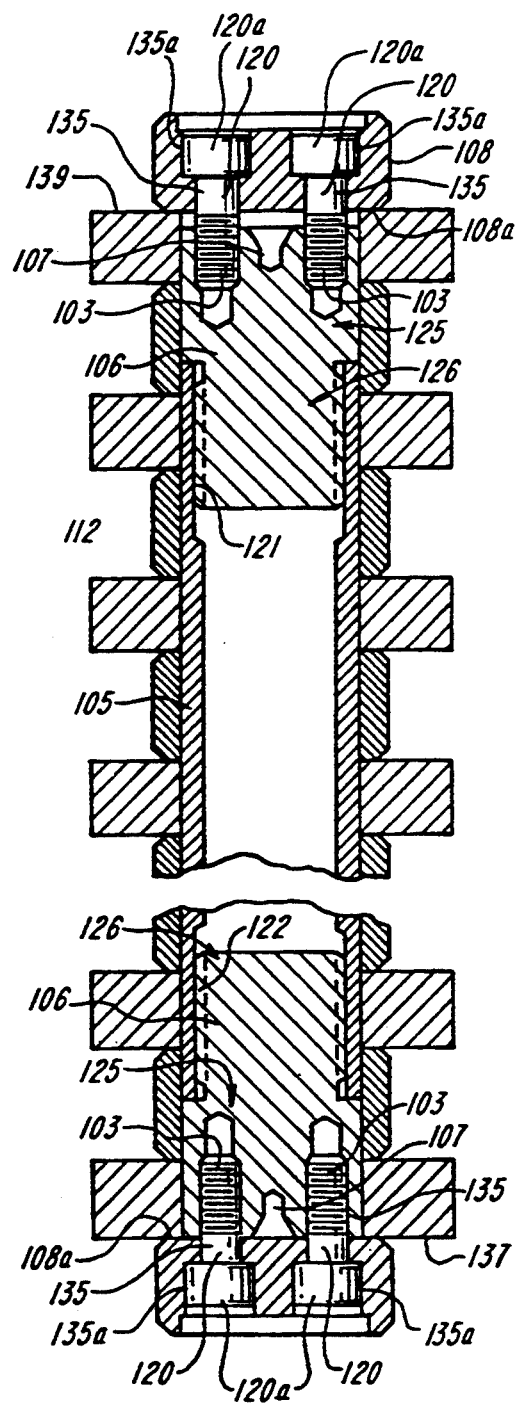
FIG. 23 is longitudinal cross-sectional side view of the ninth embodiment of the step gage of the present invention.

FIGS. 20 and 21 show yet one more embodiment of the present invention. In this embodiment, the through-rods are replaced by individual screws 100 which couple one block to the preceding block. FIGS. 20 and 21 show a gage in which each block is coupled to the preceding block by four screws 100. However, it should be understood that this type of gage can also be constructed using fewer screws in the fashion previously described with respect to embodiments utilizing fewer than four through-rods. In this four screw embodiment, each end cap block, M, may be essentially the same as the B block shown in FIG. 4B, except the four holes may be positioned in different locations on the block as shown in FIG. 20 for reasons that will become apparent. The intermediate blocks comprise alternately stacked N blocks and O blocks. The N blocks and O blocks are essentially similar to one another except they comprise two distinct hole patterns. An exemplary N block is shown in FIG. 21. In the four screw embodiment, each N and O block comprises eight holes. Four of the holes 102 are through drilled and counterbored to accept screw heads. The other four holes 104 are oversized partially through the block and tap-drilled and tapped the remaining length of the block and internally threaded for engagedly accepting the threads of the distal ends of screws 100. The N blocks and O blocks differ in that the relative positions of holes 102 and 104 are exchanged. The alternate interleaving of the N blocks and O blocks allows the blocks to be individually coupled by the screws in the gage construction. A P block is provided adjacent one of the M blocks as shown in FIG. 20. The P block comprises eight threaded holes 104 with four of the holes facing in one direction and the other four holes facing in the opposite direction. The P block allows one of the M blocks to be mounted "upside down" with respect to the other blocks.

The advantage of individually coupling each block to the preceding block with screws is that, during construction, the stack height can be checked periodically and corrected for accumulated errors. For instance, if bending is approaching an unacceptable limit, the screws of the next few blocks can be tightened differentially to keep the growing assembly within its bending tolerance. A disadvantage however, is that the stability of this type of gage is not as good as for gages using through-rods.

FIGS. 22, 23, 24, 25 and 26 show yet another embodiment of the present invention. This embodiment of the invention comprises a stacked block step gage comprising primarily the four different types of blocks illustrated in FIGS. 24A-24D. All the blocks have longitudinal, cylindrical holes 101 drilled through them to accept a tension tube 105 and end plugs 106.

The blocks are held together by an assembly comprising tension tube 105, end plugs 106, end caps 108, and screws 120. Tension tube 105 is a substantially hollow metal tube having internal screw threads at ends 121 and 122. The outer diameter of tension tube 105 is substantially equal to the inner diameter of the holes in the blocks so that tube 105 fits snugly through the holes in the blocks. End plugs 106 are substantially solid. Upper portion 125 has a diameter such that it fits snugly within the holes in the blocks. The lower portion 126 has a diameter substantially equal to the inner diameter of tension tube 105 and is externally threaded to mate with the internal screw threads at the ends 121 and 122 of the tension tube 105. The upper portion 125 of end plugs 106 contain four internally threaded blind holes 103 for accepting the distal threaded ends of screws 120.

The gage further comprises end caps 108 containing four through-holes 135 for accepting screws 120. Through-holes 135 are counterbored at 135a to create a shoulder upon which the heads 120a of screws 120 can rest within the end cap 108. The end caps are cylindrical and have a diameter greater than the diameter of the holes in the blocks such that surfaces 108a of the end caps 108 contact the outer transverse surfaces of the outermost block at each end of the gage, i.e., surfaces 137 and 139 in FIG. 23. The end caps 108 are placed over the opposing end plugs 106 and are each screwed into the corresponding end plug by the four screws 120. Surfaces 108a thereby apply a compressive force on the blocks.

Preferably, end plugs 106 contain blind holes 107 drilled through their geometric longitudinal centers so that the tube and end plug assembly may be mounted on a central axis inserted into the holes 107. The tube and end plug assembly may then be turned on center to final diameter.

Figure 24A:
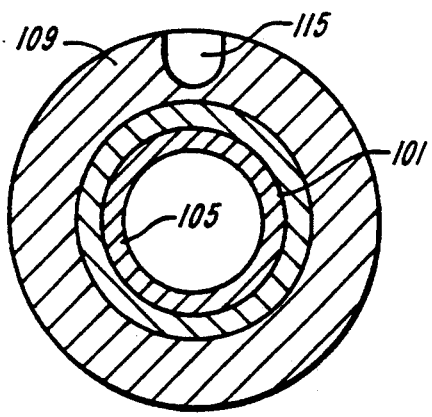
FIGS. 24A–24D are cross-sectional plan views of the various blocks which make up the gage taken along the lines indicated in FIG. 22.
Figure 24B:
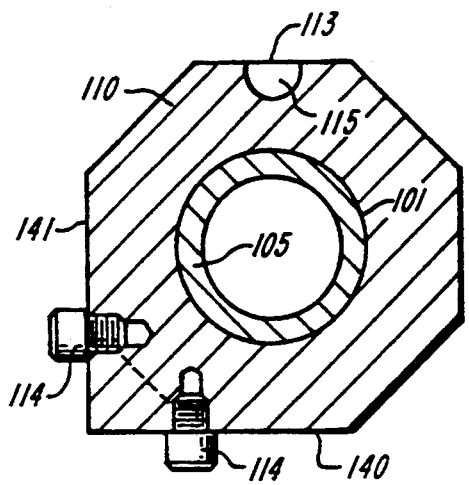
Figure 24C:
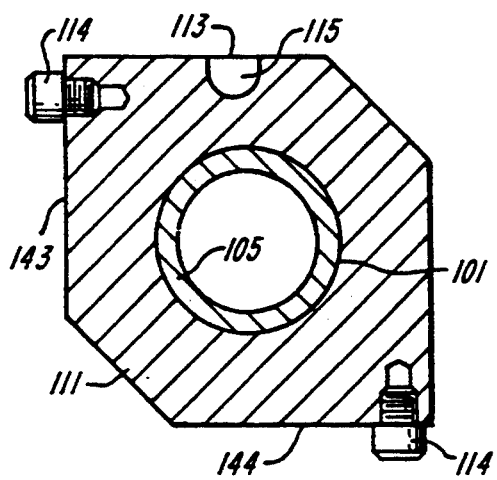
Figure 24D:
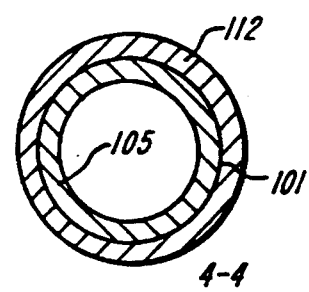
Figure 25:
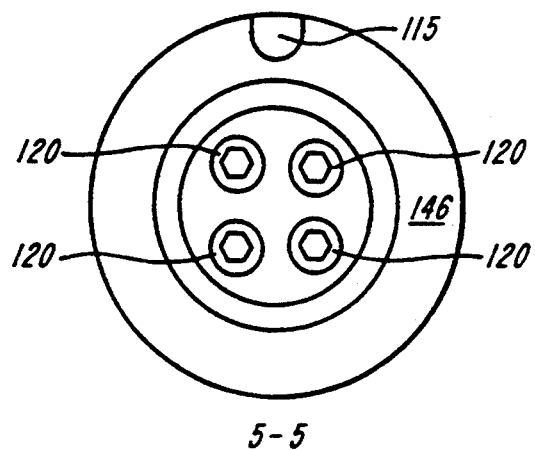
FIG. 25 is a plan view of the gage of the ninth embodiment of the invention taken along line 1—1 in FIG. 22.

The gage of this embodiment of the present invention is constructed of the three different types of measuring blocks 109, 110 and 111 shown in FIGS. 24A-24C and the spacer block 112 shown in FIG. 24D. In between end caps 108, the gage comprises spacer blocks 112 alternated with measuring blocks 109, 110 or 111.

Block 109 is illustrated in FIG. 24A and is alternated with spacer blocks 112 in all but three measurement positions in the gage. Blocks 109 are cylindrical.

Block 110 is shown in FIG. 24B and is used at two measurement positions near the opposing ends of the gage. Blocks 110 are irregular hexagons having side faces 140 and 141 perpendicular to each other. A foot 114 is mounted on each side face 140 and 141. Block 111, shown in FIG. 24C, also is an irregular hexagon although of a different geometry than block 110. It is used in the measurement position at the gage's midlength. Block 111 comprises side faces 143 and 144. Side faces 143 and 144 each have a foot 114 extending therefrom, however, in different relative positions compared to block 110.

Spacer blocks 112, shown in FIG. 24D, are cylindrical, but of smaller diameter than the measuring blocks.

All of blocks 109, 110, 111 and 112 are precision lapped to specified heights. In at least one preferred embodiment, the measuring blocks 109, 110 and 111 are precision lapped to a height of 10 mm while the spacer blocks 112 are precision lapped to a height of 15 mm.

Areas 115 on the transverse surfaces of blocks 109, 110 and 111 are the measurement surfaces. Areas 115 on blocks 109, 110 and 111 are unpainted. The remainder of the blocks are painted in order to discourage the taking of measurements at other locations on the blocks.

Side surfaces 113 of blocks 110 and 111 are precision lapped perpendicular to the measurement surfaces 115 of the blocks and are used to align the gage with machine axes when the gage is used for machine calibration. Side surfaces 113 (used to align the gage) and feet 114 are also unpainted.

The feet of blocks 110 and 111 are used to support the gage on a horizontal surface when the gage is to be used for horizontal measurements. As noted, the gage comprises two blocks of the block 110 type near its ends and one block of the block 111 type at its mid-length. Accordingly, the block can be rested on a horizontal surface in two different horizontal orientations. For instance, the gage may be rested in a first horizontal orientation on the feet extending from sides 140 and 144 of blocks 110 and 111, respectively, or it may be rested in a second horizontal orientation on the feet extending from sides 141 and 143 of blocks 110 and 111, respectively. In either horizontal orientation, the gage will be resting on three feet that are not in a straight line and which, thus, define a plane. The feet allow the gage to be rested on a horizontal surface without the gage contacting the supporting surface except at feet 114.

Figure 26:
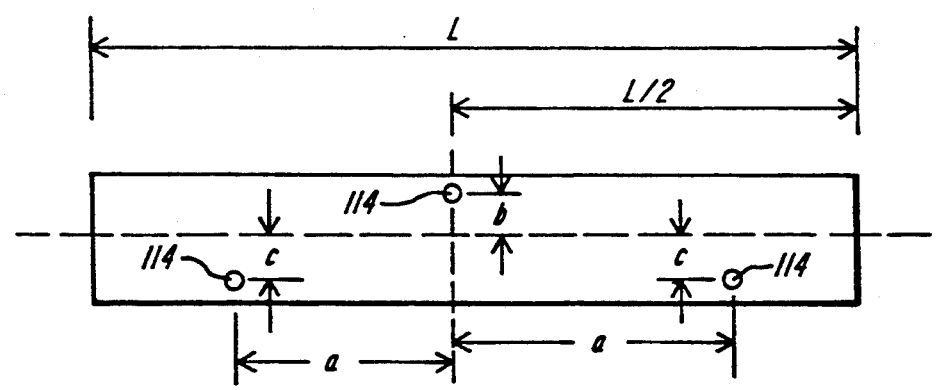
FIG. 26 is a side view of the gage of the present invention showing support feet positioning in a preferred embodiment of the invention.

If the gage is rested on the feet on sides 141 and 143 of blocks 110 and 111, respectively, the measuring surfaces 115 are on the neutral surface of the gage. However, if the gage is rested on the feet on sides 140 and 144 of block 110 and 111, respectively, the measuring surfaces are not on the neutral surface of the gage. Bending of the gage and measurement errors can be minimized by proper placement of the feet relative to each other and to the length and width of the gage. In one preferred embodiment, the distance, a, of the feet on blocks 110 from the longitudinal midpoint of the gage, i.e., the foot on block 111, are each equal to 0.361 L, where L is the total length of the gage. Further, the distance, b, of the foot on block 111 from the longitudinal center of the gage is 1.704 c, where c is the transverse distance of the foot on each of blocks 110 from the longitudinal center of the gage. FIG. 26 illustrates the relevant distances.

The gage is assembled as follows. End plugs are screwed onto the tension tube 5. One end cap 108 is screwed to one end plug 106 by four screws 120. Measurement blocks 109, 110, and 111 and spacer blocks 112 are slid onto tube 105 in the order discussed above and second end cap 108 is screwed into end plug 106 by four more screws 120. The screws apply a tension to tension tube 105 and end plugs 106 which, in turn, causes surfaces 108a to apply a compressive force on the blocks. The screws 120 may be individually torqued to compensate for bending as previously discussed.

This embodiment of the invention includes the mass and weight saving benefits of the embodiment of the FIGS. 11-15 as well as the bending compensation benefits of having four tightening screws of the embodiment of FIGS. 1-5. In fact, this embodiment of the invention has even greater mass savings than the embodiment of FIGS. 11-15 because, instead of using a tension rod, a hollow wide diameter tension tube is employed. Accordingly, not only is the tension tube of low mass because it is hollow but the blocks are of low mass because they have larger holes therethrough.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A step gage comprising:
 a plurality of blocks longitudinally stacked in contacting relation along contacting surfaces generally transverse said gage,
 measuring surfaces on a plurality of said blocks, and
 tension means for compressing said blocks together under a compressive force greater than 1000 pounds per square inch, said tension means comprising at least three adjustment means positioned relative to one another such that they cannot be intersected by a single line, said adjustment means being individually adjustable to provide different compressive forces at different points on said blocks.

2. A step gage as set forth in claim 1 wherein said blocks comprise holes longitudinally through the centers of said blocks and said tension means comprises a hollow tube adapted to be inserted in said holes through said blocks, and
 end caps adapted to be secured by said adjustment means to opposing ends of said tube, said end caps having surfaces adapted to engage surfaces of said blocks, whereby said compressive force can be applied to said blocks.

3. A step gage as set forth in claim 2 wherein said adjustment means comprise screws for adjustably securing said end caps to said hollow tube.

4. A step gage as set forth in claim 3 further comprising end plugs secured between said end caps and said tube, said end plugs and said tube having matching threads for securing of said end plugs to the ends of said tube, said end plugs comprising threaded holes for accepting said adjustment means.

5. A step gage as set forth in claim 4 wherein each of said adjustment means comprise four screws passing through an associated one of said end caps and a corresponding one of said end plugs whereby each of said end caps is secured to said corresponding one of said end plugs.

6. A step gage comprising:
 a plurality of blocks stacked in contacting relation, said blocks being compressed together under a compressive force greater than 100 pounds per square inch by compressing means, said compressing means comprising means for compensating for bending of the step gage while said blocks are being compressed together under a compressive force exceeding 100 pounds per square inch, said blocks comprising at least first and second types of alternating blocks;
 said first type of blocks having a measuring surface; and
 said second type of blocks having lateral dimensions smaller than a first dimension whereby said measuring surfaces of said first blocks are exposed.

7. A step gage as set forth in claim 6 wherein said second type of blocks are cylindrical and have a first diameter.

8. A step gage as set forth in claim 7 wherein at least some of said first type of blocks are cylindrical and have a second diameter larger than said first diameter.

9. A step gage as set forth in claim 8 wherein at least two of said first type of blocks have planar longitudinal outer surfaces force thereon, whereby said surfaces can be used for longitudinally aligning said gage.

10. A step gage as set forth in claim 6 wherein said measuring surfaces are on a neutral plane of said gage.

11. A step gage comprising:
 a plurality of blocks stacked in contacting relationship in a longitudinal direction, said blocks being in contact along surfaces oriented generally transverse of said longitudinal direction;
 apparatus for compressing said blocks together under a compressive force of at least 1000 psi, said apparatus comprising:

a tension tube extending in said longitudinal direction through a hole in each said block;

first and second end plugs secured to opposite ends of said tension tube, said end plugs having a plurality of threaded holes;

first and second end caps assembled over said first and second end plugs, respectively, each end cap comprising a plurality of countersunk holes positioned to mate with said plurality of holes in an associated end plug;

a plurality of screws, each having heads for resting in an associated countersunk hole in said end caps and a threaded distal end for engaging an associated threaded hole in said end plugs; and transverse surfaces on said end caps contacting blocks adjacent said end caps whereby compressive forces can be applied by said end caps on said blocks.

12. A step gage as set forth in claim 11 comprising a first type of block having a measuring surface and a second type of block alternating with said first type of block, said second type of block having a dimension smaller than a dimension of said first type of block to expose said measuring surfaces on said first type of block.

13. A step gage as set forth in claim 12 wherein at least two of said first type of block comprise planar longitudinal outer surfaces used for longitudinally aligning said gage.

14. A step gage as set forth in claim 12 wherein at least one of said first type of block comprises feet for supporting said gage on a horizontal surface.

15. A step gage as recited in claim 14 comprising three feet disposed on three separate blocks.

16. A step gage comprising:
a plurality of blocks stacked in contacting relation, said blocks being compressed together under a compressive force of 3809 pounds per square inch by compressing means, said compressing means including means for compensating for bending of the step gage while said blocks are being compressed together under said compressive force of 3809 pounds per square inch.

17. A step gage comprising:
a plurality of blocks stacked in contacting relation, said blocks being compressed together under a compressive force greater than 1000 pounds per square inch by compressing means, said compressing means including means for compensating for bending of the step gage while said blocks are being compressed together under a compressive force exceeding 1000 pounds per square inch.

18. A step gage comprising;
a plurality of blocks stacked in contacting relation, wherein at least some of said blocks comprise a measuring surface on the neutral axis of the block and at least some of said blocks comprise a probe clearance channel which allows access to one of said measuring surfaces, and each of said blocks comprising four through-drilled holes, four through-rods, each of said through-rods comprising a threaded cavity at each end, and a threaded screw adapted to engage the threaded cavities of the through-rods and a surface of the first and last of said blocks of said gage for applying said compressive force between the blocks.

19. A step gage comprising;
a plurality of blocks stacked in contacting relation, wherein at least some of said blocks comprise a measuring surface on the neutral axis of said block and at least some of said blocks comprise a probe clearance channel which allows access to one of said measuring surfaces, each block further comprising a pair of holes, two parallel through-rods disposed in said holes in said blocks, wherein said through rods are smaller than said holes in at least the dimension perpendicular to a line which intersects both holes and is perpendicular to the length of the through-rods, and means for inducing a compressive force in said rods which causes a compressive force on said blocks of greater than 1000 psi, whereby the compressive force in each of the through-rods can be individually selected to correct for any component of bending of the gage parallel to said line and the through-rods can be individually positioned in the corresponding elliptical holes to correct for any component of bending of the gage in a direction perpendicular to said line.

* * * * *